US007014367B2

(12) United States Patent
Miyasaka et al.

(10) Patent No.: US 7,014,367 B2
(45) Date of Patent: Mar. 21, 2006

(54) OIL-IMPREGNATED SINTERED SLIDING BEARING

(75) Inventors: Motohiro Miyasaka, Nagareyama (JP); Kazuo Maruyama, Matsudo (JP); Michiharu Mogami, Kashiwa (JP); Junichi Kobayashi, Machida (JP); Hideki Akita, Tsuchiura (JP); Osamu Gokita, Ibaraki (JP)

(73) Assignees: Hitachi Powered Metals Co., Ltd., Chiba (JP); Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 10/500,980

(22) PCT Filed: Jan. 20, 2003

(86) PCT No.: PCT/JP03/00414

§ 371 (c)(1),
(2), (4) Date: Jul. 8, 2004

(87) PCT Pub. No.: WO03/064873

PCT Pub. Date: Aug. 7, 2003

(65) Prior Publication Data

US 2005/0078894 A1 Apr. 14, 2005

(30) Foreign Application Priority Data

Jan. 30, 2002 (JP) ............................ 2002-022248

(51) Int. Cl.
*F16C 33/02* (2006.01)
*H01F 3/02* (2006.01)
*H01F 3/04* (2006.01)
*H01F 3/06* (2006.01)

(52) U.S. Cl. ...................... 384/279; 384/902; 428/566; 428/547

(58) Field of Classification Search .................. 75/228, 75/246; 384/276, 279, 322, 372, 902; 428/547, 428/566, 567, 600

See application file for complete search history.

(56) References Cited

U.S. PATENT DOCUMENTS

| | | | | |
|---|---|---|---|---|
| 2,042,635 | A * | 6/1936 | Schellens | 428/566 |
| 2,332,733 | A * | 10/1943 | Lignian | 419/27 |
| 2,763,519 | A * | 9/1956 | Thomson | 384/279 |
| 3,985,408 | A * | 10/1976 | Bierlein et al. | 384/279 |
| 4,726,695 | A * | 2/1988 | Showalter | 384/121 |
| 4,758,202 | A * | 7/1988 | Maciag et al. | 464/128 |
| 4,967,705 | A * | 11/1990 | Maciag et al. | 123/90.48 |
| 5,817,397 | A * | 10/1998 | Kamiya et al. | 428/141 |
| 6,303,235 | B1 * | 10/2001 | Kawakami et al. | 428/553 |

FOREIGN PATENT DOCUMENTS

| | | |
|---|---|---|
| EP | 0 655 562 A2 | 5/1995 |
| EP | 0 709 585 A1 | 5/1996 |
| EP | 0 709 587 A1 | 5/1996 |
| JP | 1-219108 A | 9/1989 |
| JP | 10-246230 A | 9/1998 |

* cited by examiner

*Primary Examiner*—Lenard A. Footland
*Assistant Examiner*—Colby Hansen
(74) *Attorney, Agent, or Firm*—Birch, Stewart, Kolasch & Birch, LLP

(57) ABSTRACT

An oil-impregnated sintered sliding bearing formed of a porous iron-based sintered alloy with quenched structure and receiving a high surface pressure capable of reducing the number of finishing steps by cutting and grinding and providing a bearing performance equivalent to or higher than that of conventional bearings, wherein a plurality of ridge-and-groove lines having a height difference of 2 to 12.5 $\mu$m and extending in circumferential direction are axially arranged in parallel with each other by boring the bearing surface thereof to form a wavy surface in axial direction, and the portion thereof deeper by 10 to 60 $\mu$m from the outer layer of the bearing surface is formed dense to seal surface pores so as to reduce the pores opening to the outer surface to 1 to 10 percent by area, whereby the bearing can be used at a surface pressure of 6 kgf/mm$^2$ (58.5 MPa) or higher and a sliding speed of 2 to 5 cm/s.

2 Claims, No Drawings

OIL-IMPREGNATED SINTERED SLIDING BEARING

TECHNICAL FIELD

The present invention relates to an oil-impregnated sintered sliding bearing. More particularly, the invention relates to the sintered sliding bearing that is suitable for use in the production of bearing devices such as those of construction machines, in which the sliding surface of the bearing is subjected to high surface pressure.

BACKGROUND ART

In a hydraulic excavator such as a construction machine, a bucket mounted on the tip end of arm is swung by means of a hydraulic cylinder in excavating operation. The joint mounted between the bucket and arm is composed of a sliding bearing device, which comprises a shaft and a bearing. Because the bearing device like this is subjected to a high surface pressure, a wear-resistant bearing is used and the sliding surface of the bearing is applied with a highly viscous lubricating oil, grease or wax.

The bearing of this kind is made of an iron-copper-carbon-based sintered alloy which is impregnated with a lubricating oil of high kinematic viscosity, in place of those made of cast alloy and formed by machine work or those in which the sliding surfaces are embedded with the dispersed particles of graphite. In order to improve both the mechanical strength and wear resistance, the above-mentioned oil-impregnated sintered bearing is made of a matrix of iron-carbon-based alloy containing martensitic structure and about 20% by mass of copper phases are dispersed in the alloy structure.

The bearings are mechanically hard because they are processed through heat treatment and the sizes of them are relatively large, so that the bearings are generally manufactured by machine cutting, which is finished by grinding of their inner peripheral surfaces.

The conventional oil-impregnated sintered sliding bearings like the above features are suitably used under large loads, because they are made of quenched iron alloy containing dispersed copper phases in the alloy matrix and they are impregnated with lubricating oils. However, they are produced through the finishing work of machining and grinding, which finishing work is not simple. It is, therefore, demanded that such production processes is simplified and, in addition, the obtained bearings have the performance that is equivalent to the conventional bearings.

DISCLOSURE OF INVENTION

The inventors have accomplished the present invention as a result of observation with regard to the conditions of worn surfaces of conventional oil-impregnated sintered sliding bearings and scrutinizing the results of experiments in view of the conditions of pores and the state of worn bearing surfaces.

In order to attain the above-mentioned objects, the oil-impregnated sintered sliding bearing according to the present invention is characterized in that the bearing is made of a porous iron-based sintered alloy with quenched structure. The bearing surface of the oil-impregnated sintered sliding bearing is provided with a plurality of parallel rows of ridge-and-groove lines extending in circumferential direction and wavy surface along the direction of the axis of the bearing. The ridge-and-groove lines are formed by grinding the inner peripheral surface. The vertical difference in height between the top end of a ridge line and the bottom of a groove line is 2 to 12.5 μm. The bearing surface is densified to the depth (thickness) of 10 to 60 μm so as to reduce or partially block pore openings, thereby making the percentage of open pores 1 to 10% by area. The thus obtained bearing can be used under a surface pressure of 6 kgf/mm$^2$ (58.8 MPa) or higher and at a sliding speed of 2 to 5 cm/s.

It is preferable that the sintered alloy is an iron-carbon-based alloy matrix containing martensite and dispersed copper phases. The content of copper is 15 to 25% by mass and an open porosity is 15 to 28%.

The pore openings exposed in the inner peripheral surface are formed when the surface receives radial loads in the sliding contact with a shaft and suffers from initial wearing. The oil-impregnated sintered sliding bearing of the present invention includes those in which the number of the above-mentioned exposed pore openings formed under radial loads is larger than the number of pore openings in other part of bearing surface.

The bearing of the present invention can suitably be used as the joints for hydraulic excavators of construction machines and joints for supporting crane arms.

The component members of the foregoing sliding bearing will be described in more detail.

(1) Sintered Alloy

The oil-impregnated sintered sliding bearing of the present invention is required to have high mechanical strength and high wear resistance, so that it is formed of a porous iron-based sintered alloy containing martensitic structure.

The sintered alloy, in which copper phases are dispersed in a carbon-containing alloy matrix, is especially preferred. The content of copper is 15 to 25% by mass. This porous alloy has excellent wear resistance owing to its structure, because the soft copper phases having good conformability to a shaft are dispersed in the hard iron-carbon-based alloy matrix, so that the quantities of alloy elements are small and it excels in durability. When the quantity of copper existing in a sliding surface is too small, the property of hard iron alloy becomes outstanding and the abrasive wearing of shaft is liable to occur. On the other hand, when the content of copper is too large, copper phases are deformed by high pressure of surface sliding, the copper phases are deformed and pore openings are blocked up to accelerate the abrasion. It is, therefore, preferable that the content of copper is in the range of 15 to 25% by mass.

(2) Open Porosity and Density

A porous iron-based sintered alloy having a high open porosity is preferable in view of the oil-impregnating capacity. However, when the porosity is made high, the density decreases and the mechanical strength is impaired, so that it also causes an undesirable effect on the wear resistance.

It is necessary that the open porosity of sintered alloy is 15% or more. When the open porosity is too low, the oil-impregnating capacity decreases with causing the shortage of oil supply to a sliding surface and the serviceable life of a bearing becomes short.

Meanwhile, it is also necessary that the density of sintered alloy must be 5.8 g/cm$^3$ (Mg/m$^3$) or more. When the content of copper is the maximum value of 25% by mass in the above-mentioned desirable sintered alloy, the value in density of 5.8 g/cm$^3$ (Mg/m$^3$) corresponds to an open porosity of 28%. For this reason, the open porosity is set in the range of 15 to 28%.

(3) Conditions of Bearing Surface of Bearing

The inner peripheral surface of a bearing is formed by cutting (boring) by using a lathe or the like.

In the bearing surface of the bearing, a plurality of ridge-and-groove lines are formed by boring the inner peripheral surface, in which each line extends in circumferential direction and the plurality rows of ridge-and-groove lines are arranged side by side in the axial direction. In an imaginary cross-sectional view as observed from the direction perpendicular to the axis of bearing, the ridge-and-groove lines exhibit wavy form along the axial direction, which is sometimes referred to as "wavy surface". For example, when the bearing surface is machined by using a lathe or the like, the ridge-and-groove lines are formed in a spiral along the axial direction. The difference in height between the top of a ridge line and the bottom of a groove line is in the range of 2 to 12.5 $\mu$m, and the distance between adjacent groove lines in the axial direction is in the range of about 0.3 to 0.8 mm.

The configuration of this inner surface is one of characteristic features of the sliding bearing of the present invention, which is different from the ordinary bearings of this kind. More particularly, in a conventional bearing, the inner surface is formed by grinding without forming any ridge-and-groove lines or wavy surface having a surface roughness of 0.5 to 1 $\mu$m, or oil grooves having a pitch of about 1 mm or more in axial direction are formed by sizing process or other cutting work.

In addition, the pore openings in the bearing surface are densified to the depth of 10 to 60 $\mu$m (the number of pore openings is decreased), so that the pore openings exposed to the bearing surface are reduced to 1 to 10% by area. That is, the number of pores near the outer layer of inner surface is made smaller than those in the inside portion of the bearing body and the depth of the densified outer layer is 10 to 60 $\mu$m. In other words, the depth (thickness) of the outer layer of bearing surface in which the number of pore openings is reduced by boring is in the range of 10 to 60 $\mu$m.

The pore openings observed in the outer layer comprises curved fine pores among the boundaries of grains and small pores that are connected to the curved fine pores. This fact is another characteristic feature of the invention that is different from the bearing surfaces of conventional bearings which are finished by grinding.

The machined inner surface formed as described above can be manufactured stably by previously selecting the density of bearing material and suitable working conditions such as the type of cutting tool and the feeding rate of the material to be worked.

In general practice, the forgoing surface condition can be obtained by subjecting a heat-treated bearing material to machining operation. In the case that a deeper densified surface layer is formed, it is advisable that a relatively soft sintered material before heat treatment is used for the machining.

The thus produced bearing surfaces of a bearing can hold lubricating oil, grease or the like in the groove lines, thereby supplying a sliding surface with the lubricant.

When a bearing is used in combination with a shaft, the pressure of sliding part to lubricant (oil-film strength) is high in the initial stage of use because the number of pore openings exposed in the inner surface of the bearing is relatively small. The portion receiving the action of load in the bearing surface is subjected to initial wear by the radial load of high surface pressure. Owing to the mutual oscillation between the shaft and the inner surface of bearing, the portion receiving the surface pressure is mainly subjected to initial wear. The other portions are maintained in a state with small number of pore openings with the ridge lines suffering slight abrasion.

This initial wear proceeds in the following manner.

In an initial stage, the ridge lines receiving higher radial loads are abraded and the groove lines are abraded subsequently. Because the alloy matrix is relatively hard, the abrasion occurs with little plastic flow. Accordingly, the densified surface layer is removed and many fine pores are exposed in the worn surface.

In this condition, the temperature of bearing is raised and much lubricant oil is easily released from the pore openings owing to the difference in thermal expansion. Because the rows of groove lines exist in the end portions of abraded surface, the lubricant oil or grease held in the groove lines is supplied to the portion which receive higher axial loads during the sliding contact.

The initial wear step ceases when a porous area of open pores is formed, in which axial loads are properly balanced with the lifting force of lubricant oil held in pores. An ideal state of lubrication in the sliding surface is thus created by the initial wear. In the initially worn portion near the area receiving radial loads and in other boundary region from inner surfaces, in which the number of ridge-and-groove lines gradually increase and the appearance of decreased pore openings is exhibited.

The exposed fine pores facilitate the supply of the impregnated lubricant to reduce the friction after the initial wear. Meanwhile, in the portion of bearing surface receiving small loads, the lubricant is hardly lost by the pressure of load. Furthermore, the lubricant remaining in the groove lines is supplied to the surface receiving high loads. As a result, the effect to maintain the stable sliding performance is produced.

As described above, the bearing surface of the bearing has many groove lines which reserve the lubricant, and the number of pores is reduced by being blocked owing to the height difference of the ridge-and-groove lines and to the densifying of the inner surface. In the early stage of the start of operation of such a bearing surface, the loads of shaft and the lifting force of lubricant in pores are well balanced to provide a porous surface of open pores. The maximum degree of the initial wear is in the range of allowable limit as a bearing element. This can be determined by specific conditions such as the amount of pores, the state of ridge-and-groove lines and the condition of densified surface layer of the bearing surface, in addition to the property of the alloy and the open porosity.

When there is no pore opening at all in the outer layer of the bearing surface of a bearing before the use, the effect of impregnated lubricating oil cannot be expected in the initial stage of operation. So that, the total area of pore openings in the outer layer surface is 1 to 10% by area, preferably 1 to 3% by area. It is preferable that the difference between the amount of exposed pore openings from the open porosity of sintered bearing alloy is large. When, however, the amount of exposed pore openings is more than 10% by area, the pressure loss in the sliding surface is large, the condition of the above-mentioned initial wear stage cannot be attained, while the wear advances. The value of 10% by area corresponds to the alloy product, which is obtained by machining the alloy with a density of 5.8 g/cm$^3$ (Mg/m$^3$) that is the allowable minimum value for the iron-based sintered alloy with the dispersion of copper phases. For this reason, the amount of the pore openings in the outer layer surface of bearing surface is set to 1 to 10% by area.

The preferable height difference of the ridge-and-groove lines is about 5 μm in the view of both the reserving of lubricant oil and the machinability in working. If the height difference is too small, the oil reserving property is not good, so that the height difference of 2 μm or more in average is required. Although the property to reserve lubricant oil increases when the height difference of ridge-and-groove lines is large, it may be about 12.5 μm at most with the usual material allowance in boring and with usual feeding rate in the ordinary machining. For the reason that more number of steps are required in order to obtain a larger height difference, the height difference of 12.5 μm or less is adopted in the present invention.

In the densified outer surface layer, the number of pore openings are decreased by the pressure of a cutting tool in the boring step when the ridge-and-groove lines are formed. The depth of densified layer can be determined by observing a buffed surface of the cross-section of a bearing with a microscope such that the depth from the region in which the number of pore openings is as small as 1 to 10% to the end of portion in which pores of average sizes exist. The thickness of this densified layer is preferably about 10 to 40 μm. When the thickness of densified layer is too large, it takes a long time to remove the densified layer by the initial wear, the time length of temperature rise owing to the initial wear is long and the wear loss becomes large during the initial wear step. However, in the use of the bearing according to the present invention, a comparatively large wear loss can be allowed because the bearing is employed together with a shaft that is relatively large in diameter. In the case of a heat treated sintered alloy containing the dispersion of copper phases, the maximum depth of the densified layer can be 60 μm in view of practically resulted densified layers. When a deeper layer is formed by cutting, cracks that are generated by tearing metal particles are liable to occur near the surface portion, so that it is not preferable for the reason that unusual wear occurs by exfoliation.

(4) Lubricant for Impregnation

The lubricant oils for impregnation are those used for the sliding bearing receiving high surface pressure. For instance, the lubricant having a kinematic viscosity of about 220 to 1000 cSt ($10^{-6}$ $m^2$/s) at 40° C. and a waxy semi-solid lubricant are used. The impregnated lubricant expands more than the metallic base material with the temperature rise in sliding contact and it is supplied to the sliding surface.

When a bearing is used, it is greased.

The thus obtained oil-impregnated sintered sliding bearing is used under the conditions of a surface pressure of 6 kgf/$mm^2$ (58.8 MPa) or higher and a sliding speed of 2 to 5 cm/s. The bearings of this kind are advantageously used as joints for hydraulic excavators and joints for supporting arms of crane in construction machines.

BEST MODE FOR CARRYING OUT THE INVENTION

EXAMPLE

The mode for carrying out the present invention will be described in the following by preferable examples and comparative examples.

(1) Preparation of Material for Sintered Bearing

The materials of 81.2 kg of atomized iron powder (ATOMEL 300M, produced by Kobe Steel, Ltd.), 18 kg of electrolytic copper (CE15, produced by Fukuda Metal Foil & Powder Co., Ltd.), 0.8 kg of graphite powder (CPB, produced by Nippon Graphite Ind., Ltd.) and 0.5 kg of zinc stearate powder were mixed together and the powder mixture was compressed into green compacts in a cylindrical shape. The green compacts were subjected to sintering in an atmosphere of reducing gas at a temperature of 1120° C. The quantity of connected carbon in the iron alloy matrix was 0.6%. The density of sintered product was 6.2 g/$cm^3$ (Mg/$m^3$) and the open porosity was 21%.

In view of the cross-sectional microstructure, copper phases were dispersed in the iron alloy matrix and pores having average sizes of about 30 to 50 μm were dispersed.

The sintered product was subjected to heat treatment at 850° C. and then to oil-quenching and it was subsequently annealed at 180° C. The obtained sintered bearing material contained martensitic structure.

(2) Grinding

The inner and outer surfaces of bearing and side faces of the heat treated sintered bearing material were subjected to machining using a lathe with a cutting tool made of cemented carbide. The cutting was carried out such that the sintered bearing material was rotated once during the axial shifting of 0.5 mm the reciprocating operation.

As a comparative example, the inner peripheral surface of one of the foregoing machined product made by the cutting was subjected to grinding by a grinding machine with rotating both of a bearing material and a whetstone.

The inner diameter of each bearing sample was 50 mm and the total length was 50 mm.

Both the bearing samples finished by different conditions as described above were cut crosswise into separate pieces. They were then observed with regard to the micro-structures concerning the amount of pore openings in the bearing surfaces and in the cross-sectional cut surfaces. In addition, the surface roughness in axial direction was measured with a probe-type surface roughness measuring device and the cross-sectional wavy configurations were observed.

In the microscopic observation concerning the bearing sample according to the present invention, the bearing surface was a smooth metallic surface having thin curved pores, which were supposed to be the boundaries between metallic particles, and small pores wider than the curved pores were observed. The area of these pores was about 2% of the area of bearing surface. The roughness of metallic surface was about 0.5 μm forming a wavy shape with a pitch of 0.5 mm in the direction of axis. The height difference between a ridge and a groove of the wavy shape was 4 to 6 μm. In the observation on a micro-structure of the lapped surface of the cross-section of the bearing, it was understood that number of large pores were decreased under the machined surface and pores of larger than 50 μm could be observed in the depth of about 40 μm from the surface, and pore openings in the outer surface was reduced to 10% or less by area.

In the sample of comparative example, the ground bearing surface had many fine scratches and the roughness of plane metallic surface was 0.5 to 1 μm. The exposed pore openings in the bearing surface were 1% by area. According to the microscopic observation of the cross-section of this bearing, it was understood that the depth of surface layer to the layer containing pores of more than 50 μm in width was about 20 μm in average.

(3) Impregnation of Lubricant

The bearing samples were impregnated with a lubricant oil which is equivalent to ISO VG 460 (having kinematic viscosity of 460 cSt ($10^{-6}$ $m^2$/s) at 40° C.) under vacuum.

(4) Test of Bearings

Each bearing sample was fixed to a housing and the bearing surface of the bearing sample and a shaft which was quenched and ground, were applied with grease. The shaft was applied with a load in the radial direction to impart a surface pressure of 8 kgf/$mm^2$ (78.4 MPa). The shaft was rotated with an oscillation angle of 100 degrees and at a sliding speed of 1.2 m per minute. The shaft was stopped for 0.5 sec at each end of the oscillation.

In the evaluation, a thermocouple was mounted on the outer surface of a bearing sample to measure the temperature of the bearing and when the temperature reached 150° C., the test was stopped. The temperature of 150° C. means that seizure by wear is considered to occur in view of experience.

(5) Measured Results of Bearing Temperature

The thus obtained results of bearing temperatures are shown in the following Table 1.

As described above, in the oil-impregnated sintered sliding bearing according to the present invention, the temperature rise is slow and its time period is relatively long in the initial wear stage. In the stage of stable operation condition, the bearing can exhibit the property, which is comparable to conventional bearings. In addition, the serviceable life of the bearing is rather extended as long as the prolonged stable period of the initial wear. Furthermore, the bearing has an advantage in that it can be produced inexpensively because it can be produced without the grinding process. Still further, in the like manner as the bearing finished by grinding, the oil-impregnated sintered sliding bearing having high durability can be produced by utilizing the initial wear during the practical use of the bearing.

TABLE 1

| Time Length of Operation | 0 hr | 1 hr | 3 hrs | 5 hrs | 10 hrs | 20 hrs | 30 hrs |
|---|---|---|---|---|---|---|---|
| Example of This Invention | 25° C. | 80° C. | 95° C. | 90° C. | 85° C. | 76° C. | 75° C. |
| Comparative Example | 25° C. | 103° C. | 92° C. | 86° C. | 83° C. | 82° C. | 82° C. |

As shown in Table 1, it was understood concerning the oil-impregnated sintered sliding bearing of the present invention that the temperature rose gradually in the initial stage and, subsequently, it lowered to some extent into a steady state and almost the same temperature was maintained until 30 hours.

In the case of the comparative example in which the inner peripheral surface was ground, the temperature rose more intensely as compared with the foregoing example of this invention. While, the high temperature period was comparatively short and almost the same temperature as that of the steady state of the former example was maintained.

In both the examples, the temperatures were below 150° C.

(6) Discussion of Results

In view of results of the observation of inner peripheral surfaces of bearings, it is considered that the changes in temperatures during the operation tests depend upon the following reason.

In the oil-impregnated sintered sliding bearing according to the present invention, the temperature rises in the progress of the initial wear in the early stage, in which the lack of the lubricant tends to occur on the surface receiving the radial load. Subsequently, the abraded surface is supplied with the lubricant from the groove lines and the temperature rise slowed down. A certain period of time is required to form a porous area of open pores, in which the axial load is balanced with the lifting force of the lubricant in the pores of the bearing, so that the high temperature period is longer. When a suitable porous area of open pores is formed to balance the load with the lubrication, the initial wear is ceased. The temperature of the bearing then lowers and the progress of wear stops to stabilize the sliding characteristics, as the effects of the wear resistance owing to the relatively hard iron-carbon-based alloy having quenched structure and dispersed relatively soft copper phases; the optimum amount of pore openings; and the auxiliary effect to supply lubricant from the groove lines.

In the case of the comparative example, the lubricant becomes short and the initial wear progresses in the early stage of operation, so that the temperature rises to a higher level than that of the example of the present invention. Then, a porous surface of open pores is formed by suitable abrasion so as to balance the axial load with the lifting force of lubricant in the pores of bearing, so that a suitable state of sliding may be generated by the initial wear. After the initial wear, the wear does not proceed any longer and the temperature lowers to stabilize the sliding characteristics.

INDUSTRIAL APPLICABILITY

As being described above, in the oil-impregnated sintered sliding bearing which is suitable for use under high contact pressure according to the present invention, a sliding surface for the use under high surface pressure can be formed during the use of the bearing and the state of low friction can be maintained for a long period of time. Therefore, it is possible to prolong the interval of maintenance schedule of, e.g., construction machines, by which the improvement in quality of bearings and the reduction of maintenance costs can be expected. Furthermore, it is advantageous in reducing the number of process steps by eliminating the grinding work for finishing the bearing surface.

What is claimed is:

1. An oil-impregnated sintered sliding bearing used for joints of a hydraulic excavator or joints for supporting a crane arm of a construction machine under a surface pressure of 6 kgf/mm$^2$ (58.8 MPa) or higher and at a sliding speed of 2 to 5 cm/s, which is made of a porous iron-based sintered alloy with quenched structure and said sintered alloy matrix contains martensitic structure and dispersion of copper phases, the content of copper is 15 to 25% by mass and the open porosity is 15 to 28%, wherein plurality of parallel ridge-and-groove lines having a height difference of 2 to 12.5 $\mu$m, extending in circumferential direction and a wavy surface in axial direction are formed by boring the bearing surface of said bearing, thereby the outer layer of said bearing surface being densified to the depth of 10 to 60 $\mu$m so as to block up the pore openings to 1 to 10% by area.

2. The oil-impregnated sintered sliding bearing used for joints of a hydraulic excavator or joints for supporting a crane arm of a construction machine as claimed in claim 1, wherein pore openings are exposed in the bearing surface and in its adjacent area by the initial wear of sliding with an axis under radial loads and the amount of said exposed pore openings is larger than the amount of pore openings in other area of inner bearing surface.

* * * * *

UNITED STATES PATENT AND TRADEMARK OFFICE

CERTIFICATE OF CORRECTION

PATENT NO. : 7,014,367 B2
APPLICATION NO. : 10/500980
DATED : March 21, 2006
INVENTOR(S) : Miyasaka et al.

It is certified that error appears in the above-identified patent and that said Letters Patent is hereby corrected as shown below:

Title Page Item (53) 1, the Assignees should be corrected as follows:

"Hitachi Powered Metals Co., Ltd."

should read

-- Hitachi Powdered Metals Co., Ltd. -- .

Signed and Sealed this

Fifth Day of September, 2006

Jon W. Dudas

JON W. DUDAS
*Director of the United States Patent and Trademark Office*